(12) United States Patent
Fine

(10) Patent No.: US 10,418,844 B2
(45) Date of Patent: Sep. 17, 2019

(54) SYSTEMS AND METHODS FOR COUPLING POWER TO DEVICES

(71) Applicant: Empire Technology Development LLC, Wilmington, DE (US)

(72) Inventor: Kevin S. Fine, Yverdon-les-Bains (CH)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 16/101,285

(22) Filed: Aug. 10, 2018

(65) Prior Publication Data

US 2018/0351395 A1 Dec. 6, 2018

Related U.S. Application Data

(63) Continuation of application No. 14/480,007, filed on Sep. 8, 2014, now Pat. No. 10,069,324.

(51) Int. Cl.
*H02J 7/02* (2016.01)
*H02J 50/40* (2016.01)
*H02J 50/12* (2016.01)
*H02J 50/80* (2016.01)

(52) U.S. Cl.
CPC .............. *H02J 7/025* (2013.01); *H02J 50/12* (2016.02); *H02J 50/40* (2016.02); *H02J 50/80* (2016.02)

(58) Field of Classification Search
CPC .. H02J 7/025; H02J 50/12; H02J 50/40; H02J 50/80
See application file for complete search history.

(56) References Cited

U.S. PATENT DOCUMENTS

| | | | |
|---|---|---|---|
| 5,005,001 A | 4/1991 | Cordery | |
| 5,764,196 A | 6/1998 | Fujimoto et al. | |
| 5,940,765 A | 8/1999 | Haartsen | |
| 7,126,450 B2 | 10/2006 | Baarman et al. | |
| 8,024,012 B2 | 9/2011 | Clevenger et al. | |
| 8,115,448 B2 | 2/2012 | John | |
| 8,169,185 B2 | 5/2012 | Partovi et al. | |
| 8,390,249 B2 | 3/2013 | Walley et al. | |
| 8,559,659 B2 | 10/2013 | Chu et al. | |

(Continued)

FOREIGN PATENT DOCUMENTS

| | | |
|---|---|---|
| CN | 102082449 A | 10/2005 |
| CN | 101645618 A | 2/2010 |

(Continued)

OTHER PUBLICATIONS

WiTricity Corp; accessed at http://web.archive.org/web/20140426154535/http://www.witricity.com/pages/company.html, accessed on Aug. 29, 2014, 1 page.

(Continued)

*Primary Examiner* — David M. Gray
*Assistant Examiner* — Michael A Harrison

(57) ABSTRACT

Systems and methods to wirelessly transmit power are provided. A power delivery system may include a central controller assembly and a transmit assembly. The central controller assembly can form transmit coils in the transmit assembly. The central controller assembly can also receive information from devices coupled to the transmit assembly and optimize the transmit coils based on the received information and on information about the transmit assembly.

19 Claims, 10 Drawing Sheets

(56) References Cited

U.S. PATENT DOCUMENTS

| | | | |
|---|---|---|---|
| 9,118,203 B2* | 8/2015 | Davis | H02J 5/005 |
| 9,384,885 B2 | 7/2016 | Karalis et al. | |
| 9,515,512 B2 | 12/2016 | Odonnell | |
| 2002/0178385 A1 | 11/2002 | Dent et al. | |
| 2009/0093227 A1 | 4/2009 | Egelmeers et al. | |
| 2009/0176450 A1 | 7/2009 | Chow et al. | |
| 2010/0034238 A1 | 2/2010 | Bennett | |
| 2010/0174629 A1 | 7/2010 | Taylor et al. | |
| 2010/0201201 A1 | 8/2010 | Mobarhan et al. | |
| 2010/0201315 A1 | 8/2010 | Oshimi et al. | |
| 2010/0219694 A1 | 9/2010 | Kurs et al. | |
| 2010/0225270 A1 | 9/2010 | Jacobs et al. | |
| 2010/0276995 A1 | 11/2010 | Marzetta et al. | |
| 2010/0295378 A1 | 11/2010 | Suzuki | |
| 2012/0001485 A1 | 1/2012 | Uchida | |
| 2012/0019074 A1 | 1/2012 | Frolov et al. | |
| 2012/0080957 A1 | 4/2012 | Cooper et al. | |
| 2012/0112552 A1 | 5/2012 | Baarman | |
| 2012/0153739 A1 | 6/2012 | Cooper et al. | |
| 2012/0169139 A1 | 7/2012 | Kudo | |
| 2012/0212074 A1 | 8/2012 | Uchida | |
| 2012/0235508 A1 | 9/2012 | Ichikawa | |
| 2012/0290470 A1 | 11/2012 | Lee et al. | |
| 2012/0326660 A1 | 12/2012 | Lu et al. | |
| 2013/0069587 A1 | 3/2013 | Kuk | |
| 2013/0106347 A1 | 5/2013 | Kallmyer et al. | |
| 2013/0134792 A1 | 5/2013 | Bunsen et al. | |
| 2013/0147428 A1 | 6/2013 | Kirby et al. | |
| 2013/0234527 A1 | 9/2013 | Ishihara et al. | |
| 2013/0249306 A1 | 9/2013 | Kim et al. | |
| 2013/0271069 A1 | 10/2013 | Partovi | |
| 2013/0300210 A1 | 11/2013 | Hosotani | |
| 2013/0307344 A1 | 11/2013 | Cheon et al. | |
| 2014/0021798 A1 | 1/2014 | Kesler et al. | |
| 2014/0035385 A1 | 2/2014 | Hatanaka | |
| 2014/0197694 A1 | 7/2014 | Asanuma | |
| 2014/0300202 A1 | 10/2014 | Shimokawa | |
| 2014/0320369 A1 | 10/2014 | Azenui | |
| 2015/0001955 A1 | 1/2015 | Yamada et al. | |
| 2015/0048976 A1 | 2/2015 | Petersen et al. | |
| 2015/0180548 A1 | 6/2015 | Roh et al. | |
| 2015/0280482 A1 | 10/2015 | Rosenfeld | |

FOREIGN PATENT DOCUMENTS

| | | |
|---|---|---|
| CN | 101971453 A | 2/2011 |
| CN | 202475041 U | 10/2012 |
| CN | 202651905 U | 1/2013 |
| CN | 103248139 A | 8/2013 |
| CN | 203261135 U | 10/2013 |
| CN | 103843229 A | 6/2014 |
| WO | 2010047850 A1 | 4/2010 |
| WO | 2012157115 A1 | 11/2012 |
| WO | 2013102908 A1 | 12/2013 |

OTHER PUBLICATIONS

E-textiles; accessed at http://web.archive.org/web/20140701073636/http://en.wikipedia.org/wiki/E-textiles, last modified on May 28, 2014, 1-17 pages.

"Cryptographically secure pseudorandom Number generator", Accessed at http://web.archive.org/web/20140404073330/http://en.wikipedia.org/wiki/Cryptographically_secure_pseudorandom_number_generator, Accessed on Aug. 30, 2014, 1-7 pages.

"DIGI-Key corporation", Accessed at http://www.digikey.com/product-detail/en/STL25N15F3/497-8785-6-ND/2043712, Accessed on Aug. 30, 2014, 1-2 pages.

"Dynamically Tunable RF", WiSpry; accessed at http://web.archive.org/web/20131208154954/http://wispry.com/index.php, accessed on Aug. 29, 2014, 1 page.

"Inductance", accessed at http://web.archive.org/web/20140413101910/http://en.wikipedia.org/wiki/Inductance, last modified on Mar. 20, 2014, 1-14 pages.

"Localization using WiFi Signal Strength", accessed at http://web.archive.org/web/20100707014422/http://robotics.usc.edu/~ahoward/projects_wifi.php, accessed on Aug. 29, 2014, 1-2 pages.

"Murata Taps Capacitive-Coupled Method for Wireless Power Transfer", Technology Focus, Murata Manufacture Co. Ltd., Nov. 2011, 35-37 pages.

"N-channel 150 V, 0.045 Ω, 6 A PowerFLAT™ (6x5) STripFET™ III Power MOSFET", Accessed at http://www.st.com/st-web-ui/static/active/en/resource/technical/document/datasheet/CD00227531.pdf, Mar. 2009, 1-12 pages.

"Power-line communication", accessed at http://web.archive.org/web/20140821163104/http://en.wikipedia.org/wiki/Power_line_communication, last modified on Aug. 17, 2014, 1-12 pages.

"Q factor", Accessed at http://web.archive.org/web/20140415212242/http://en.wikipedia.org/wiki/Q_factor, last modified on Mar. 17, 2014, 1-10 pages.

"Varicap", Accessed at http://web.archive.org/web/20140415122319/http://en.wikipedia.orgiwiki/Varicap, Accessed on Mar. 13, 2014, 1-10 pages.

"Varicap", accessed at http://web.archive.org/web/20090628171327/http://en.wikipedia.org/wiki/Varactor, last modified on May 29, 2009, 1-2 pages.

"Wireless Electricity Delivered Over Distance", accessed at http://web.archive.org/web/20140426154458/http://www.witncity.com/index.html, accessed on Aug. 29, 2014, 1 page.

"WS1050 Tunable RF Capacitor", WiSpry, Inc; 2013, 1-3 pages.

Balouchi, F, et al., "Wireless Power: Mobile Devices, Consumer Electronics, Industrial Devices, Wireless Power Infrastructure, and Wireless Charging of Electric Vehicles: Technology Analysis, Environmental Impact, and Market Forecasts", Pike Research Report, 2012, 1-6 pages.

Butler, K, "Tour WiTricity's Room of Tomorrow: Wireless Charging That's Flexible", accessed at http://web.archive.org/web/20140402220152/http://blog.laptopmag.com/tour-witricitys-room-of-tomorrow-wireless-charging-thats-flexible, posted on Jan. 12, 2013, 1-4 pages.

Cannon, B.L, et al., "Magnetic resonant coupling as a potential means for wireless power transfer to multiple small receivers", IEEE Transactions on Power Electronics, vol. 24, No. 7, 2009, 1819-1825 pages.

Endler, M, "Intel Charges Ahead With WCT Wireless Power Standard", accessed at http://web.archive.org/web/20121127140531/http://www.informationweek.com/hardware/processors/intel-charges-ahead-with-wct-wireless-po/240006662?, posted on Sep. 4, 2012, 1-3 pages.

Jamonation, "SCYP Wifi Localization Tool Demo", accessed at http://www.youtube.com/watch?v=nTd-mCzlwYM, uploaded on Dec. 11, 2008, 2 pages.

Karalis, A, et al., "Efficient wireless non-radiative mid-range energy transfer", Annals of Physics, vol. 323, No. 1, 2008, 34-48 pages.

Kurs, A, et al., "Wireless power transfer via strongly coupled magnetic resonances", Science, vol. 317, Aug. 17, 2007, 83-86 pages.

Mohan, C, et al., "Wireless Power Transmission & Charging of Batteries in Multiple Electronic Accessories", International Journal of Science, Engineering and Technology Research (IJSETR), vol. 2, No. 1, Jan. 2013, 8-17 pages.

Morris, K, "Highly Resonant Wireless Power Transfer: Safe, Efficient, and over Distance", WiTricity Corporation, 2013, 1-32 pages.

Nalty, K, et al., "Classical Calculation for Mutual Inductance of Two Coaxial Loops in MKS Units", Austin, TX 78750 USA, Mar. 6, 2011, 1-8 pages.

Purcher, "Apple Reveals Master Details of Wireless Charging System", accessed at http://web.archive.org/web/20140726222945/http://www.patentlyapple.com/patently-apple/2013/09/apple-reveals-master-details-of-wireless-charging-system.html, posted on Sep. 19, 2013, 1-9 pages.

Rattner, J, "Rattner: The Promise of Wireless Power", Accessed at http://blogs.intel.com/intellabs/2008/10/02/rattner_the_promise_of_wireles/, posted on Oct. 2, 2008, 1-5 pages.

(56) References Cited

OTHER PUBLICATIONS

Sample, A.P, et al., "Analysis, experimental results, and range adaptation of magnetically coupled resonators for wireless power transfer", IEEE Transactions on Industrial Electronics, vol. 58, No. 2, 2011, 544-554 pages.

Tsui, A.W.T, et al., "Accuracy Performance Analysis between War Driving and War Walking in Metropolitan Wi-Fi Localization", IEEE Transactions on Mobile Computing, vol. 9, No. 11, Nov. 2010, 1551-1562 pages.

Weingartner, M, "Wireless Power—Wireless Resonant Energy Link (WREL)", Accessed at http://web.archive.org/web/20130116070245/http://newsroom.intel.com/docs/DOC-1119, last modified on Jul. 8, 2010, 1-2 pages.

Woodward, C, "WiTricity's Wireless-Power Tech Attracts $25M from Intel, Foxconn", accessed at http://web.archive.org/web/20131203220433/http://www.xconomy.com/boston/2013/10/23/witricitys-wireless-power-tech-attracts-25m-intel-foxconn/, posted on Oct. 23, 2013, 1-3 pages.

Zhou, X, et al., "Wireless information and power transfer: Architecture design and rate-energy tradeoff", Global Communications Conference (GLOBECOM), 2012 IEEE, Dec. 3-7, 2012, 3982-3987 pages.

\* cited by examiner

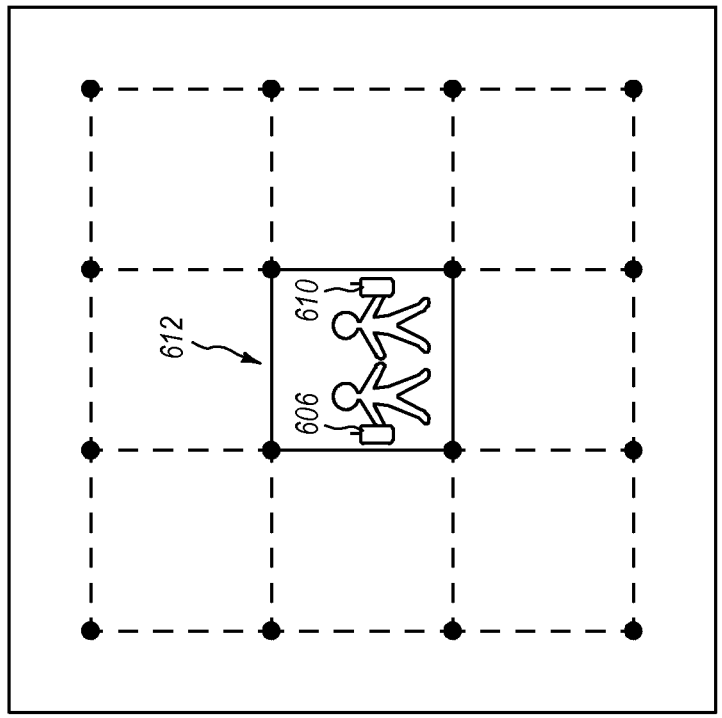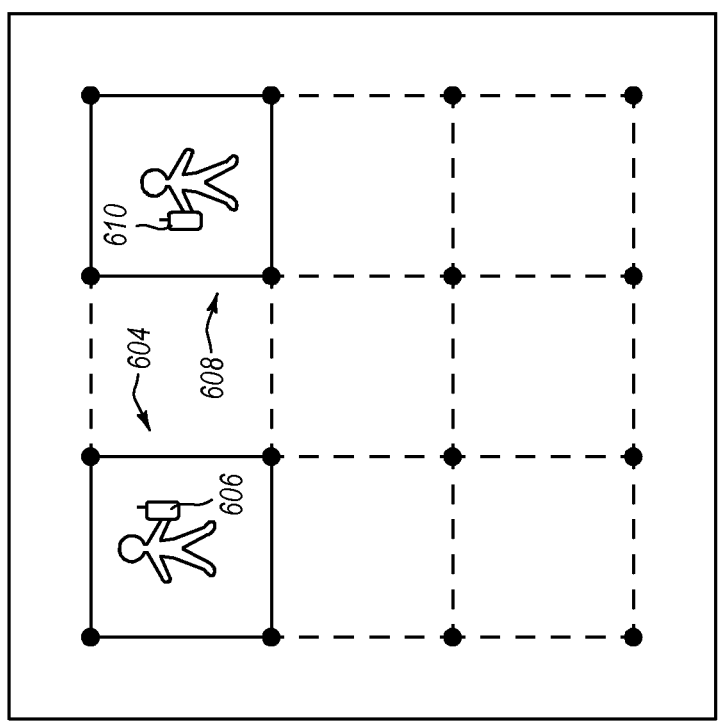
FIG. 6

SYSTEMS AND METHODS FOR COUPLING POWER TO DEVICES

RELATED APPLICATIONS

This application is a continuation of, and claims priority to, U.S. patent application Ser. No. 14/480,007, filed Sep. 8, 2014, the contents of which are incorporated herein by reference in their entirety.

TECHNICAL FIELD

The present disclosure generally but not exclusively relates to wireless power transmission.

BACKGROUND

Unless otherwise indicated herein, the materials described in this section are not prior art to the claims in this application and are not admitted to be prior art by inclusion in this section.

Wireless power transfer is a technology that can wirelessly transfer power to a device using coils. This technology can be used, for example, to charge the battery of a device using a signal that is delivered to the device wirelessly. Generally, power is wirelessly delivered when a source's transmit coil couples with a device's receive coil.

Although many devices may benefit from wireless power transfer, there are many factors that complicate the effective delivery of power wirelessly. For example, the size of the device, the shapes of the transmit coil and of the receive coil, and the distance between the transmit coil and the receive coil are examples of such factors. In addition, many of these devices are portable. The portability of the devices results in changes in positional relationships that further complicate the wireless delivery of power. In addition, the ability to effectively deliver power to multiple devices also impacts wireless power deliver.

SUMMARY

Some embodiments disclosed herein relate to a power delivery system and to methods associated with the wireless delivery of power. An example of a power deliver system for delivering power to a device wirelessly may include a central controller assembly and a transmit assembly. The transmit assembly may include a plurality of conductive segments and a plurality of junction boxes. Each junction box may be configured to selectively connect one of the plurality of conductive segments to at least one other conductive segment of the plurality of conductive segments. Together, the plurality of junction boxes are configured to selectively couple at least some of the plurality of conductive segments to form a transmit coil in the transmit assembly in response to a control signal from the central controller assembly.

An illustrative example of a junction box that may be adapted to establish a transmit coil in an environment that includes conductive components may include a housing, a controller, and one or more switches. The housing may include one or more connections and each connection may be configured to connect with a conductive component. At least one switch may be associated with each connection and each switch may be controlled by the controller. The switches may be controlled such that the conductive components associated with connections can be selectively and electrically connected and disconnected to each other.

An illustrative method for delivering power to a device may include scanning to detect the device and receiving information from the device. The information received from the device may include a voltage and/or a frequency of a receive coil of the device to determine whether the device receives power wirelessly from a transmit coil. The method may also include adjusting a configuration of the transmit coil based on the information to improve the power delivered to the device wirelessly.

An illustrative example of a central controller assembly configured to coordinate with distributed controllers to manage transmit coils formed from conductive components to deliver power wirelessly to devices may include a central controller operatively coupled with the plurality of distributed controllers. The central controller assembly may also include an interface component configured to receive information from the devices. The central controller may determine whether the devices are receiving power from at least one transmit coil. The central controller may also be configured to dynamically adjust a configuration of the at least one transmit coil based on the information received from the devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 6 illustrates an example of transmit coils in a grid that are dynamically reconfigured;

DETAILED DESCRIPTION

Figure 1:
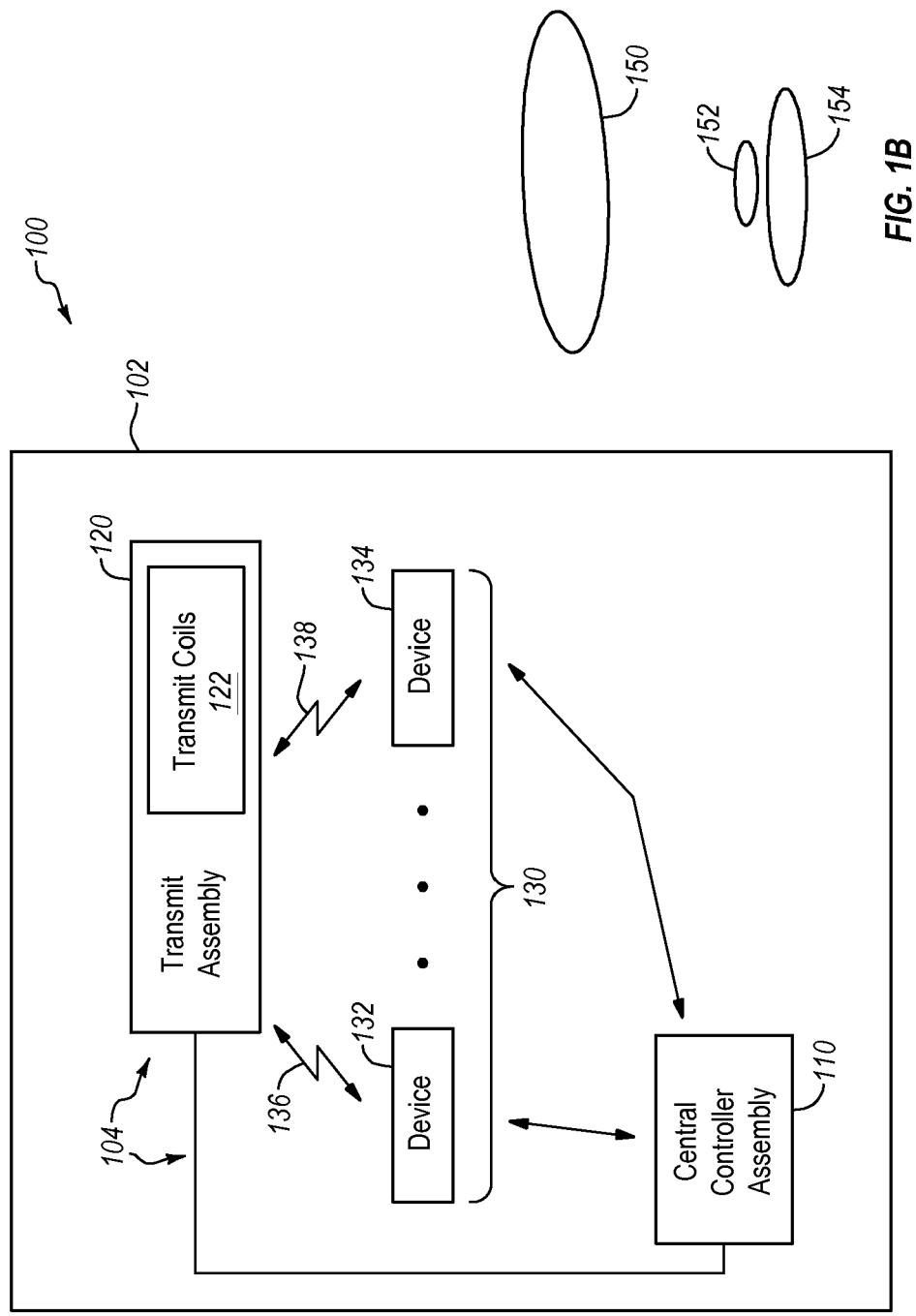
FIG. 1A illustrates an example of a power delivery system configured to wirelessly deliver power to one or more devices in an environment.
FIG. 1B illustrates an example of a transmit coil that may be configured to deliver power to a receive coil.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the figures, can be arranged, substituted, combined, separated, and designed in a wide variety of different configurations, all of which are explicitly contemplated herein.

Power can be delivered to a device wirelessly using a transmit coil. When the transmit coil is energized with an appropriate signal (e.g., an alternating current), the transmit coil generates a magnetic field. A receive coil (e.g., an antenna) in or associated with a device can magnetically couple with the transmit coil. The magnetic field generated by the transmit coil can induce a corresponding current and voltage in the receive coil and the device can then use the current and voltage for various purposes. Thus, energy can be transferred to devices wireless when the devices couple or connect wirelessly with the transmit coil.

Embodiments relate to a power delivery system that can delivery power to one or more devices in different types of environments such as, by way of example, airports, shops, convention centers, office buildings, tower buildings, or the like. In some examples, an existing infrastructure or portion thereof (e.g., an existing electrical system) can be used to form part of the transmission components of a power deliver system. The conductive components (new or existing) of an electrical system (e.g., electrical wires, conduit) can be connected in multiple ways to form multiple transmit coils of different sizes, shapes, and configurations. The ability to connect the conductive components is multiple ways may be facilitated by junction boxes. Junction boxes are configured to connect and/or disconnect some of the conductive components such that the transmit coils can be dynamically reconfigured and such that various characteristics of the transmit coils can be adjusted.

An example of a power delivery system may include conductive components such as already present and/or new conductive components. Examples of conductive components include, by way of example, electrical wiring, electrical conduits, and/or other conductive components. In a given infrastructure, the conductive components are arranged in a grid. The configuration of the grid may be defined by the conductive components that are already present in the infrastructure and/or by the way that the conductive components are connected. Additional conductive components could be added to the grid. The grid of conductive components may not be arranged in a uniform manner. However, various transmit coils can be formed in the grid.

The power delivery system may also include one or more junction boxes. Junction boxes already present in the infrastructure may be updated with additional components or replaced with new junction boxes. The grid could be expanded by the addition of new junction boxes and new conductive components. Generally, some of the conductive components in a grid come together at each of the junction boxes.

Each junction box may include a controller that allows the conductive components that meet at the junction box to be connected in different configurations. By controlling which conductive components are connected and which conductive components are disconnected, transmit coils of different sizes, shapes, and/or locations can be formed. The transmit coils can also be reconfigured, reshaped, disassembled, and/or relocated. In some examples, the housing of the junction box is optional. One or more switches and/or one or more connections may be mechanically supported in any suitable manner, for example mounted on a circuit board. A junction box may be embodied in a variety of forms and shapes. In one example, a junction box may by any device or apparatus that allows conductive components to be connected and/or disconnected such that transmit coils can be formed, reformed, adjusted, shaped, or the like or combination thereof.

The power deliver system may also be associated with modules that may be configured, by way of example only, to track the efficiencies of the transmit coils, optimize the operation characteristics of the transmit coils, track devices that use or are associated with the power delivery system, or the like. The modules may also adapt transmission frequencies of the transmit coils.

In one example, conventional alternating current (AC) power is transformed into high frequency magnetic fields (e.g., 0.1 to 20 MHz). Information obtained from devices that use or that are coupled to the power delivery system can provide information such as frequency and voltages that allow a central controller assembly to adjust the transmit coils for efficient power transfer.

The central controller assembly may include various applications or modules. One module may be configured to register new devices. Another module may be configured to search for new or more optimum transmit coil configurations and implement the changes necessary to instantiate the optimum configurations of the transmit coils. A module may also be configured to adapt the power delivery system to changes related to devices that join/exit the power delivery system.

The central controller assembly may also maintain certain types of data in one or more databases. One database may store transmit coil configurations and information about each transmit coil configuration. Because the arrangement of the conductive components and junction boxes is known, all potential transmit coil configurations may be predetermined and may be stored in this database. In addition, information about each transmit coil configuration may be stored in the database. Based on the stored information, this database can be searched to identify an optimum transmit coil configuration for a given scenario. Another database may store information about users and/or the devices associated with the users. Another database may store information about different types of receive coils and/or different types of devices. These databases could be implemented as a single database.

The central controller assembly manages operation of the transmit coils. In order to maintain the efficient power transfer, the transmit coil and the receive coil should have the same resonant frequency. In one example, the junction boxes each include a variable reactance (e.g., a variable capacitor). This allows the resonant frequency of the transmit coil to be adjusted. In one example, the central controller assembly is also configured to receive information from the devices that are coupled to the transmit coil or associated with the power delivery system. The devices may transmit information related to their receive coils, such as whether a voltage is being received, a frequency and a voltage. This information can be used to adjust the characteristics of the transmit coil to optimize the delivery of power to the device. The transmit coils can be dynamically reconfigured in order to accommodate changes, such as movement of the devices, that may impact the power transfer.

FIG. 1A illustrates an example of a power delivery system configured to wirelessly deliver power to one or more devices in an environment. FIG. 1 illustrates an environment 100 that may include an infrastructure 102. The infrastructure 102 may be, by way of example, a building of any type and of any size. The infrastructure 102 could also be an outdoor structure.

A power delivery system 104 may be implemented in or integrated with the infrastructure 102 using components that are already present in the infrastructure 102 or with components that are added to the infrastructure 102. In other words, the infrastructure 102 provides a place in which the power delivery system 104 may be implemented. Some embodiments may incorporate aspects of the infrastructure 102, such as the electrical system, while other embodiments may be entirely added to the infrastructure 102.

The power delivery system 104 may include a central controller assembly 110 and a transmit assembly 120. The central controller assembly 110 and the transmit assembly 120 are capable of communication using wired and/or wireless networks. Part of the infrastructure 102 may be used to form part of the communication network. For example, the electrical system could be used to transmit signals between the central controller assembly 110 and transmit assembly 120.

The transmit assembly 120 is configured to form and operate one or more transmit coils 122. In one example, the central controller assembly 110 can control a configuration of the transmit coils 122. The transmit assembly 120 can be configured to form and shape the transmit coils 122. In one example, the transmit assembly 120 includes conductive components that can be arranged and rearranged to form one transmit coil, multiple transmit coils, transmit coils of different shapes and sizes and in in different locations within the infrastructure 102.

When the transmit coils 122 are formed and receive power (for example from a power system associated with the infrastructure 102), the transmit coils 122 can couple wirelessly with the receive coils associated with the devices 130.

The configuration of the transmit coils 122 may depend on the positional relationship of the devices 132 and 134 relative to the transmit assembly 120 and/or on information provided to the central controller assembly 110 by the devices 130. The devices 130 may communicate with the central controller assembly 110 over a local network or over the Internet. The devices 130 can communicate information that includes, by way of example, whether the devices are receiving power from the transmit assembly 120 and information that describes how strong the connection and information that describes characteristics of the devices such as frequency and voltage measurements induces in the receive coils of the devices.

The central controller assembly 110 can configure the transmit coils 122. For example, if the devices 132 and 134 are relatively close to each other (e.g., at the same table or within some predetermined parameter), it may be possible to configure a single transmit coil that can deliver power wirelessly to both devices. Both of the devices 132 and 134 couple magnetically couple with the same transmit coil. If the devices 132 and 134 are further apart (e.g., on different floors of the infrastructure 102), then a transmit coil may be configured for each of the devices.

The power delivery system 104 can dynamically configure the transmit coils 122 at any time. If the device 134 moves or changes location, for example, the movement of the device 134 can be detected and tracked by the power delivery system 104. In one example the information provided to the central controller assembly 110 by the device 134 may change (e.g., a lower voltage being received). As a result, the transmit coils 122 can be dynamically reconfigured or rearranged by the central controller assembly 110 to accommodate movement of the device 134. The transmit coils 122 can also be reconfigured or rearranged to accommodate the addition and/or removal of devices that couple with the transmit coils 122. Reconfiguration or rearrangement of the transmit coils 122 may include a change in one or more of a location of a transmit coil, a shape or size of the transmit coil, a frequency of the transmit coil, or the like.

FIG. 1B illustrates an example of a transmit coil that may be configured to deliver power to a receive coil wirelessly. FIG. 1B illustrates a transmit coil 150, a receive coil 152 associated with a device such as the device 132 or 134, and an intermediate coil 154. When an alternating current (AC) is provided to the transmit coil 150 (by way of example only at a frequency between 0.1 to 20 MHz) a magnetic field is established in response to the alternating current. The receive coil 152 can magnetically couple with the transmit coil 150 and when coupled, a corresponding AC current is generated in the receive coil 152. The current and/or voltage in the receive coil 152 can be used by the associated device, for example, to charge the device's battery.

In one example, an intermediate coil 154 can also be used in the power delivery process. In one example, the ability of the transmit coil 150 to adequately couple with the receive coil 152 (e.g., in terms of power delivered) may be inhibited by a distance between the transmit coil 150 and the receive coil 152 or by a size of the receive coil 152. An intermediate coil 154 can improve the power deliver process. The intermediate coil 154 may couple with the transmit coil 150. In turn, the intermediate coil 154 may be closer to the receive coil 152 and may couple with the receive coil 152. Power can be delivered wirelessly to the receive coil via an intermediate coil.

Figure 2:
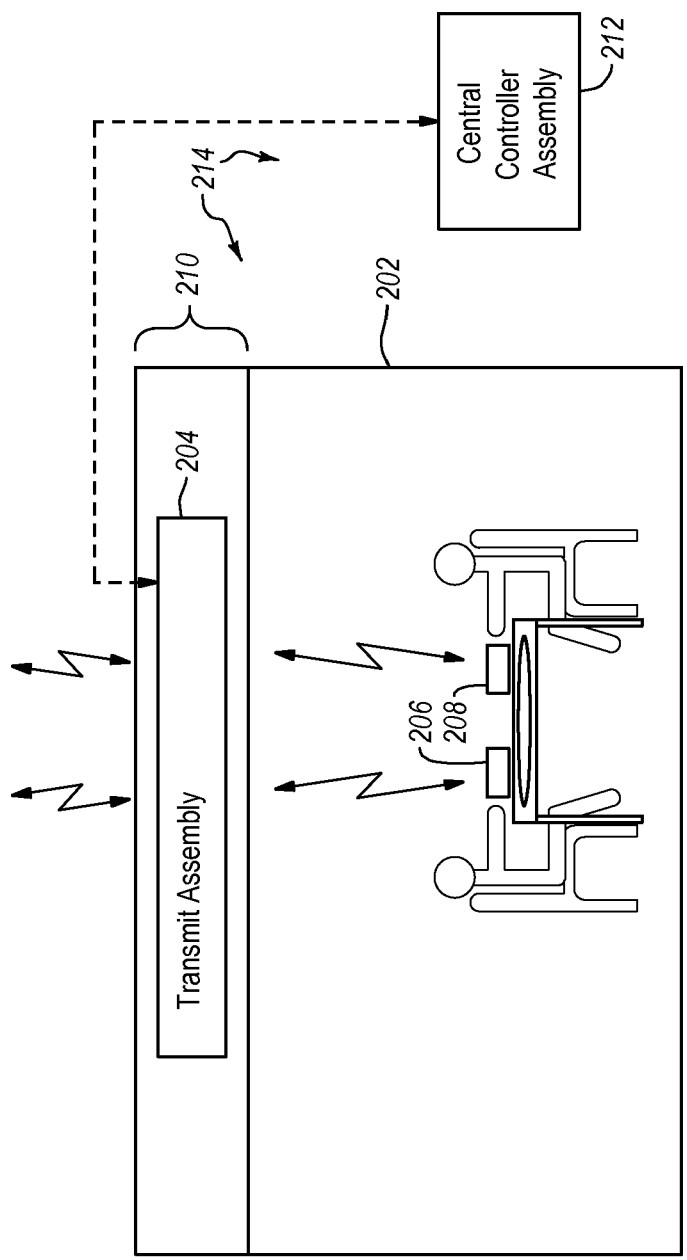
FIG. 2 illustrates and example of a power delivery system in an infrastructure.

FIG. 2 illustrates and example of a power delivery system in an infrastructure. FIG. 2 illustrates an example of a power delivery system 214, which is an example of the power delivery system 104. The power delivery system 214 includes a central controller assembly 212 and a transmit assembly 204. Multiple transmit coils can be formed in the transmit assembly when the conductive components therein are selectively connected and/or disconnected.

FIG. 2 also illustrates an infrastructure 202, which is an example of the infrastructure 102. In FIG. 2, the transmit assembly 204 (or a portion thereof) is located in a ceiling 210 of the infrastructure 202. When the devices 206 and 208 are detected, the transmit assembly 204 can be configured such that a transmit can deliver power to the devices 206 and 208 wirelessly. In one example, the transmit assembly 204 may be able to provide power to devices below the ceiling 210 as well as to devices above the ceiling 210 (e.g., a higher floor of the infrastructure 202).

The central controller assembly 212 may be connected to the transmit assembly 204 and may also be connected to each transmit coil formed in the transmit assembly 204. The central controller assembly 212 does not need to by physically connected to the transmit coil. All communications can be performed wirelessly. Power necessary for operation of the transmit assembly 204 can be obtained from the electrical system of the infrastructure 202.

The central controller assembly 212 may be capable of communication with each of the transmit coils formed in the transmit assembly 204 separately and may be capable of determining characteristics of each transmit coil such as current, voltage, resonant frequency, or the like. The central controller assembly 212 can thus dynamically reconfigure each transmit coil independently of other transmit coils.

The communication between the transmit assembly 204 (or with each transmit coil) and the central controller assembly 212 may be via a wired and/or a wireless connection. The central controller assembly 212 may also be capable of communicating with the devices 206 and 208. The devices 206 and 208 may transmit characteristics related to the wireless power transfer to the central controller assembly 212. The central controller assembly 212 can use this information to adapt the transmit coils in the transmit assembly 204. The central controller assembly 212, for example, can change a configuration of the transmit coils, change a resonant frequency of the transmit coils, change a location/shape/size of one or more transmit coils or the like or any combination thereof.

Figure 3:
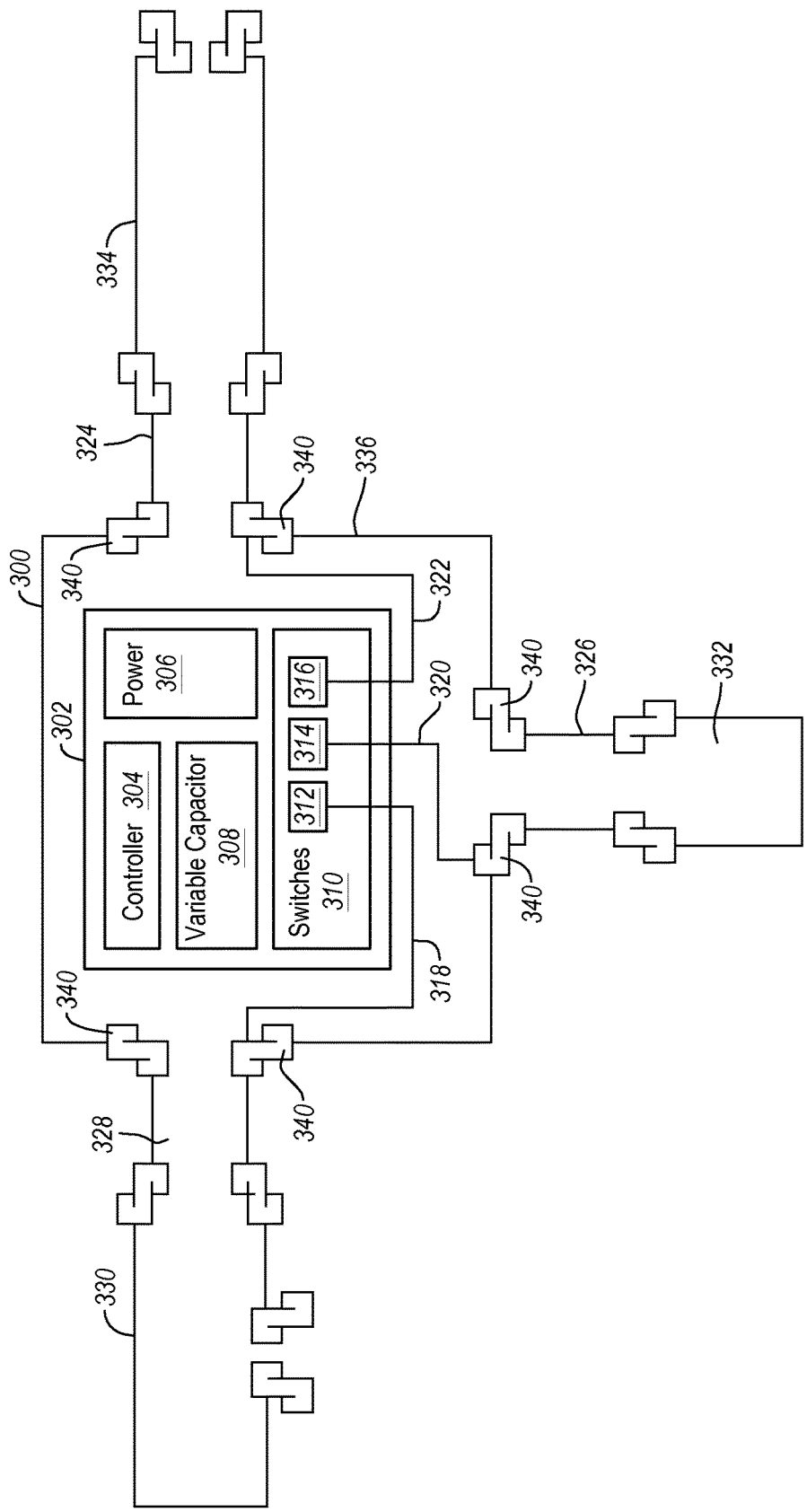
FIG. 3 illustrates an example of a junction box that may be included in a transmit assembly and that may be configured to connect and disconnect conductive components to form and rearrange transmit coils.

FIG. 3 illustrates an example of a junction box that may be included in a transmit assembly and that may be configured to connect and disconnect conductive components to form and rearrange transmit coils. FIG. 3 illustrates a junction box 300. The junction box 300 illustrated in FIG. 3 can be included in a power delivery system when an existing junction box is reconfigured, when an existing junction box is replaced, or when the junction box 300 is added to the power delivery system. The junction box 300 is not limited to the shapes and sizes of conventional junction boxes. The junction box 300 can be incorporated into other components. For example the junction box 300 can be incorporated into a light fixture, into a ballast, into air duct components or the like. The junction box 300, in one example, is an apparatus or device that can be placed in an environment or in an infrastructure that can be configured to connect/disconnect conductive components.

The junction box 300 may include a housing 336 that houses a board 302. The board 302 may include a power supply 306, a box controller 304, a variable capacitor 308, and switches 310. The housing 336 may or may not be formed of a conductive material.

FIG. 3 further illustrates that the junction box 300 can be attached to other junction boxes (junction boxes 330, 332, and 334) by a length of conduit (which is an example of a conductive member), by a wire, or other conductive material. Some connections may be non-conductive. In FIG. 3, the conduit 328 associates the junction box 300 with the junction box 330, the conduit 326 associates the junction box 300 with the junction box 332, and the conduit 324 associates the junction box 300 with the junction box 334. In another example, the connections may be the wiring or another conductive component. When the existing electrical wiring is used to form a transmit coil, the existing electrical wiring may capacitively couple the signal used to deliver power wirelessly in order to isolate the AC current from the signal that is used to deliver power wirelessly.

In a conventional infrastructure, junction boxes and conduit may be used to establish a path for electrical wiring. The junction boxes 300, 330, 332, and 334 and the conduit 324, 236, and 238 may also be used for conventional electrical wiring. In one example, the power supply 306 receives electrical power by connecting to electrical wiring 338.

The controller 304 on the board 302 is capable of forming portions of transmit coils. The controller 304, for example, controls the switches 312, 314, and 316 that are included in the switches 310. When the switches 312 and 314 are on and the switch 316 is off, the conduit 328 and the conduit 326 are electrically connected by the connections 318 and 320. Similarly, the conduit 328 and the conduit 324 can be connected when the switches 312 and 316 are turned on and the switch 314 is turned off. The switches may be power MOSFET switches in one example.

The controller controls the states of the switches 310 in response to commands or communications from the central controller assembly. Because the junction boxes 330, 332, and 334 may be configured similarly to the junction box 300, the various conduits (or other conductive members) can be connected in multiple transmit coil configurations. Thus, the junction boxes are configured such that the conductive members of a transmit assembly can be rearranged and reconfigured when the conduits are connected in different configurations.

The board 302 also includes a variable capacitor 308 (e.g., a varactor). The resonant frequency of a transmit coil in which the junction box 302 participates can be adjusted when the variable capacitor 308 is adjusted (e.g., by adjusting a voltage applied to a varactor). The variable capacitor 308 can be adjusted by the controller 304, for example in response to commands from a central controller assembly.

In one example, an insulator 340 may be included and positioned to electrically separate the conduits from the housing 336 of the junction box 300 if necessary. The conduits or other conductive components may also be encased in an insulator. Also, the electrical wiring 338 could be used as the conductive components to form a transmit coil. As previously stated, the electrical wiring 338 could be capacitively coupled to the signal used for wireless power delivery.

Figure 4:
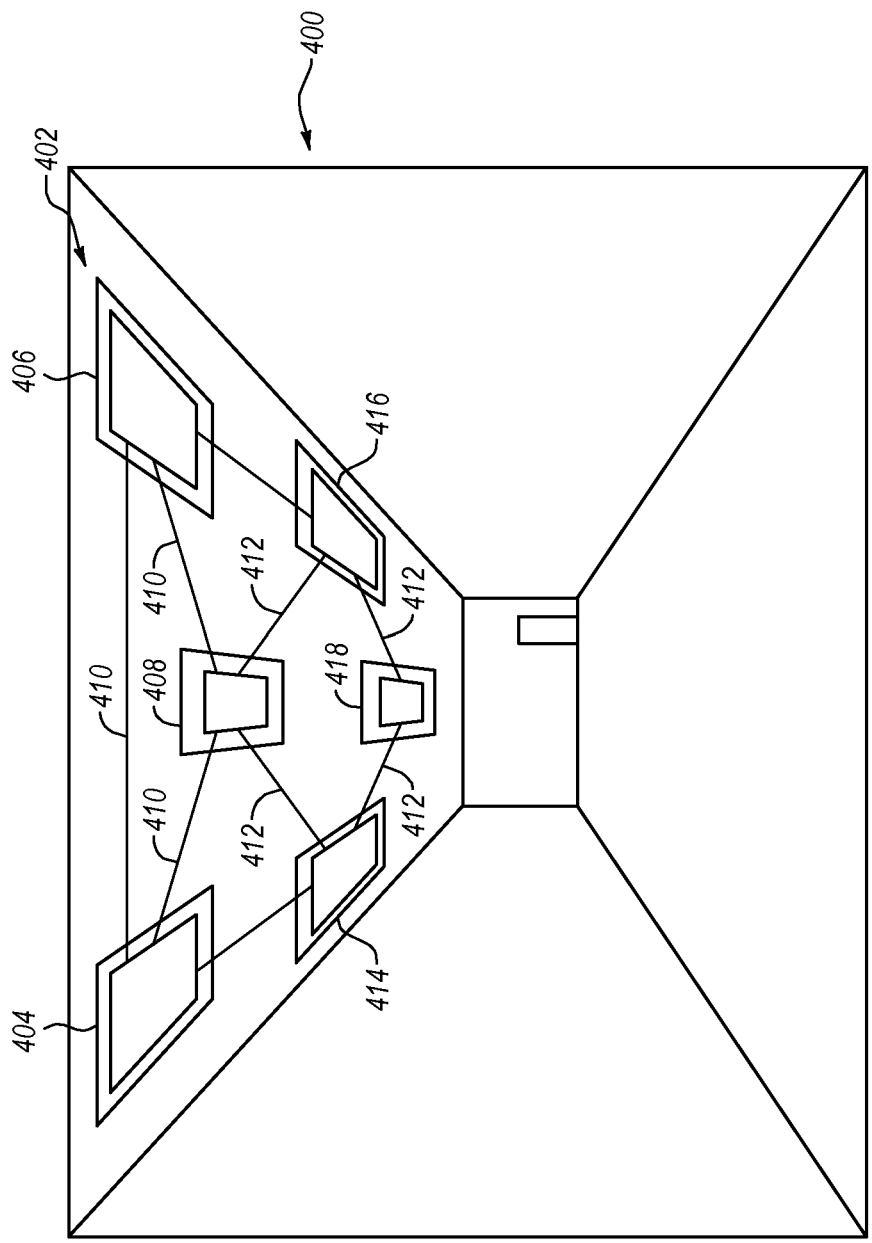
FIG. 4 illustrates a part of an infrastructure that includes a transmit assembly.

FIG. 4 illustrates an infrastructure 400 (e.g., a room, a floor of a building, an assembly hall, a terminal, etc.) in which a transmit assembly 402 is located. In one example, the transmit assembly 402 may be located in a ceiling of the infrastructure 400. FIG. 4 illustrates lights that are each associated with or that include junction boxes 404, 406, 408, 414, 416, and 418. Conductive components are connected between the junction boxes.

FIG. 4 illustrates that the junction boxes 404, 406 and 408 can be configured to connect the conductive components 410 to form a transmit coil. Alternatively, the junction boxes 408, 414, 416 and 418 could be configured to connect the conductive components 412 to form a different transmit coil. In another example, the conductive components can be arranged to form both of the transmit coils. The conductive components illustrated in FIG. 4 could also be connected in other configurations to form other transmit coils.

The transmit coil formed by the junction boxes 404, 406, and 408 is formed in response to commands from the central controller assembly to connect the relevant conductive components. In one example, the signal used to deliver power wirelessly is delivered to the transmit coil over the existing electrical system. The transmit coil may be capacitively coupled to the electrical system such that the signal is applied to the transmit coil. Impedances may be matches as necessary.

Figure 5:
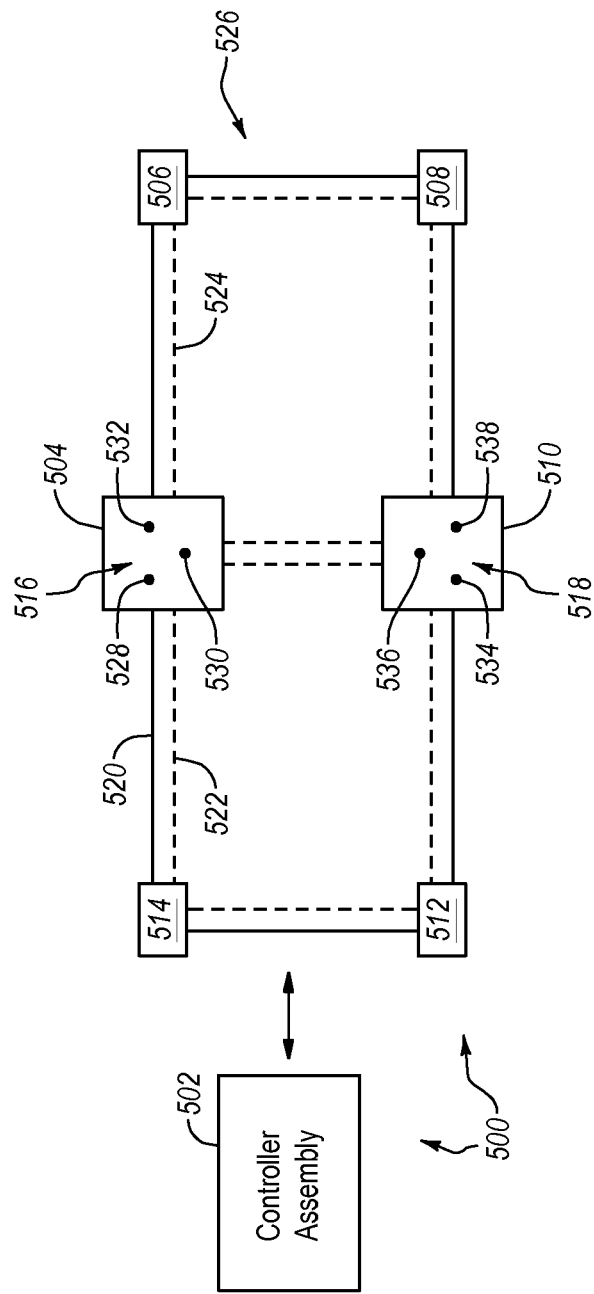
FIG. 5 illustrates an example of junction boxes and conductive components that can be dynamically configured to form different transmit coils in a transmit assembly.

FIG. 5 illustrates an example of junction boxes and conductive components that can be dynamically configured to form different transmit coils in a transmit assembly. FIG.

5 illustrates an example of a power delivery system 500 that may include a central controller assembly 502 and a transmit assembly 526. The controller assembly 502 may communicate with junction boxes 504, 506, 508, 510, 512 and 514 or with controllers therein. The controllers included in the junction boxes 504, 506, 508, 510, 512 and 514 are responsive to commands issued by the central controller assembly 502. The central controller assembly 502 can send specific commands to specific junction boxes such that the appropriate connections are established in the transmit assembly.

In one example, the junction box 504 may include three switches 516 and the junction box 510 may include three switches 518. The other junction boxes 506, 608, 512 and 514 may each include two switches. Because the junction boxes 506, 508, 512 and 514 are each associated with two conductive members in this example, the associated conductive members could be permanently connected and the switches could be omitted. The configuration of the transmit assembly 526 may influence how the junction boxes 506, 508, 512 and 514 are configured.

FIG. 5 illustrates that at least three transmit coils can be formed in the transmit assembly 526. A transmit coil 520 (the solid line) may be formed when the switches 528, 532, 534, and 538 are on while the switches 530 and 536 are off. This configures the conductive components to form the transmit coil 520 in the transmit assembly 526.

A transmit coil 522 (the evenly dashed line) can be formed on one side of the transmit assembly 526 when the switches 528, 530, 534 and 536 are on and the switches 532 and 538 are off. A transmit coil 524 (dot dot dash line) can be formed on the other side of the transmit assembly 526 when the switches 530, 532, 536, and 538 are on and the switches 528 and 534 are off. The junction boxes 506, 508, 512 and 514 may have similar switches whose state is controlled to form or deconstruct transmit coils.

In one example, the central controller assembly 502 may typically communicate with multiple junction boxes in order to form a specific transmit coil such as the transmit coil 520. The communication may be wireless or over a wired network. The electrical wires may form part of the communication network. The junction boxes may each have an associated identifier such that the junction boxes can identify commands that are intended for them in one example. The communication may also be secure to prevent interference with the operation of the power delivery system.

The characteristics of the transmit coil 520 (and of the other potential transmit coil configurations of the transmit coils 522 and 524) may be stored in a memory by the central controller assembly 502. The central controller assembly 502 may also adjust characteristics, such as the resonant frequency, of each of the formed transmit coils. This can be achieved when the variable capacitance at one or more of the junction boxes associated with the transmit oil is adjusted.

The switches 516 and 518 are toggled on or off in response to commands from the controller assembly 502. In one example, the switches may all be toggled off. In another example, default transmit coils may be active such that devices can be detected and added to the system.

FIG. 6 illustrates an example of transmit coils in a grid that are dynamically reconfigured. More specifically, FIG. 6 illustrates an example of transmit coils that are reconfigured or rearranged at least in response to positional changes in devices that are or have been coupled to the transmit coils. FIG. 6 illustrates a transmit assembly in an infrastructure at two different times. In the transmit assembly 602a, a transmit coil 604 is coupled with a device 606 and a different transmit coil 608 is coupled with a device 610.

Over time, the devices move with respect to the transmit assembly 602. In the transmit assembly 602b, the devices 606 and 610 are relatively close. As a result, the central controller assembly may reconfigure the transmit coils in the transmit assembly 602. In this example, the transmit coils 606 and 610 are removed or deconstructed and a different transmit coil 612 is formed by connecting appropriate conductive components in the transmit assembly 602.

FIG. 6 illustrates that the conductive components in the transmit assembly 602 can be reconfigured, for example, dynamically to track a user in a given environment. The transmit coils can effectively follow the devices such that the transfer of power is optimized or most efficient. In one example, the efficiency of power transfer is influenced by a distance between the transmit coil and a device. When the distance becomes larger, the efficiency drops. By reconfiguring the conductive components to form a new or different transmit coil, the efficiency of the power transfer can remain optimized.

A transmit coil can be optimized in different ways. A transmit coil can be optimized in the context of maximum power delivery. The transmit coil can also be optimized in terms of location to serve a larger number of devices. The transmit coil could also be maximized in terms of cost or in terms of maximum efficiency at lowest cost.

Figure 7:
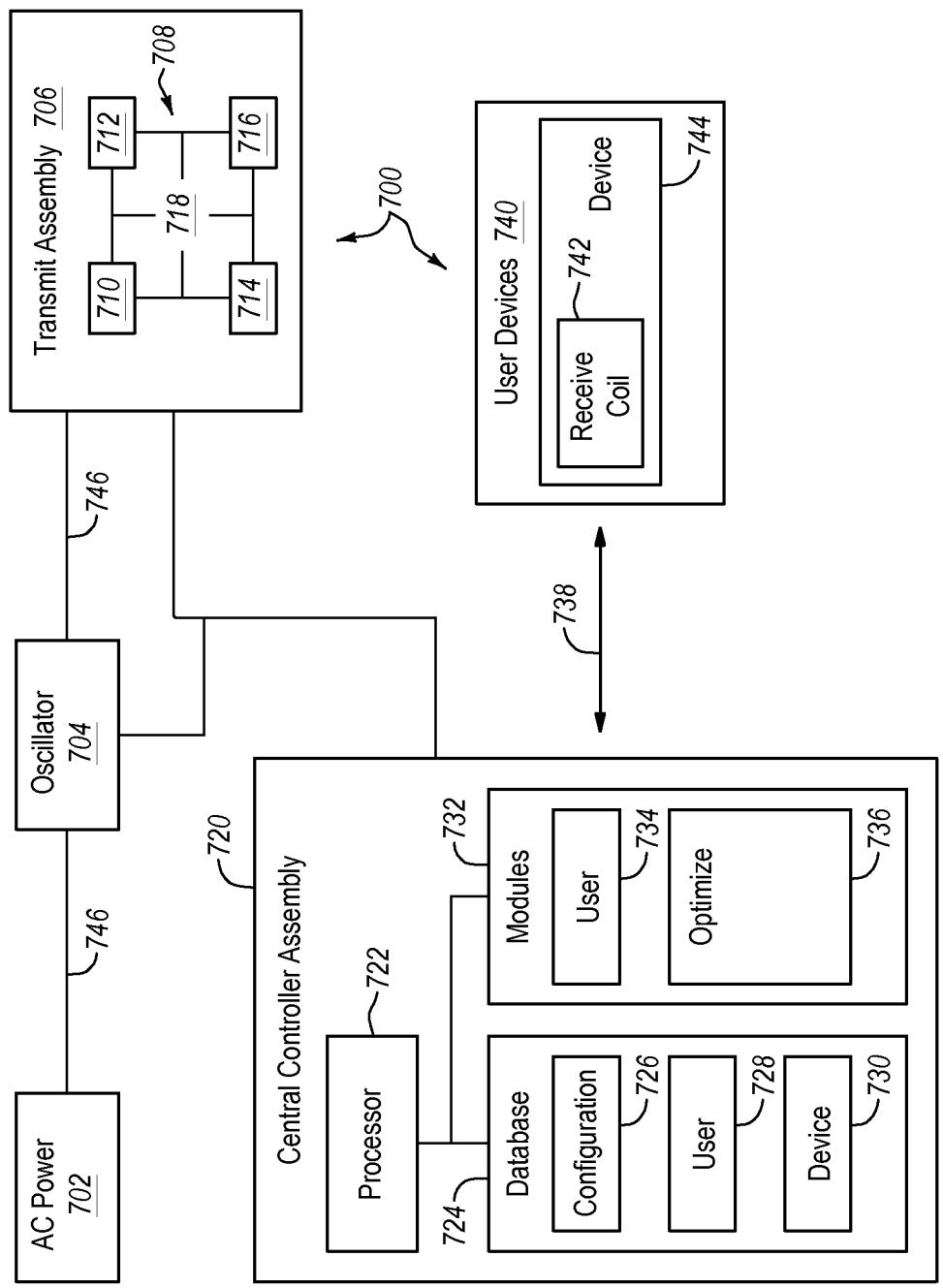
FIG. 7 illustrates an example of an environment that includes a power delivery system configured to deliver power wirelessly to one or more devices.

FIG. 7 illustrates an example of an environment that includes a power delivery system configured to deliver power wirelessly to one or more devices. FIG. 7 illustrates a transmit assembly 706 that includes conductive components 708. The conductive components 708 are associated with junction boxes 710, 712, 714, and 716, which may each be an example of the junction box 300 illustrated in FIG. 3. The conductive components 708 may be electrical conduit, electrical wires, or the like, or any combination thereof.

The junction boxes 710, 712, 714, and 716 (or the controllers therein) are able to communicate with the central controller assembly 720. The central controller assembly 720 can issue commands to form transmit coils in the transmit assembly 706, reconfigure transmit coils in the transmit assembly 706, change characteristics of the transmit coils in the transmit assembly 706, or the like.

FIG. 7 also illustrates AC power 702 and an oscillator 704. The oscillator 704 is able to transform a signal from the AC power 72 into a high frequency signal that is applied to the transmit assembly 706. The high frequency signal may be capacitively coupled to the electrical system 746 such that the high frequency signal can be delivered to the transmit coil 708.

The frequency applied to the transmit assembly 706 or to the transmit coil 708 can be changed by the central controller assembly 720. In one example, the frequency and amplitude of the oscillator 704 can be controlled by the central controller assembly 720. In addition to changing the capacitance as previously described to change characteristics of the transmit coil 708, the oscillator 704 can also be controlled to control characteristics of the transmit coils formed in the transmit assembly 706.

The central controller assembly 720 may be a computer or computing device in one example and may include a processor 722 (or other controller). The central controller assembly 720 may also include a database 724 that may include a configuration database 726, a user database 728, and a device database 730. The central controller assembly 720 further includes modules 732 such as a user module 734 and an optimization module 736. The user module 734 may be operable to add devices and/or users and delete devices and/or users from the system 700.

The configuration database 726, in one example, may store potential transmit coil configurations. Each transmit coil configuration may be associated with entries that identify switch settings, capacitance values, adjacent configurations, a scan entry, an active entry, and a cost entry. The switch settings identify which switches are turned on/off for the associated transmit coil. The capacitance values for a desired resonant frequency may be stored in the capacitance values entry. The capacitance values may be included as voltage settings for a varactor in one example. The adjacent configurations entry may be used to identify transmit coil configurations that can be formed my making small modifications (e.g., a change to one or more switches, a change in capacitance) to the existing transmit coil. The scan entry may identify which transmit coils to use to scan for new users. The active entry identifies whether the transmit coil is active and the cost entry identifies a cost associated with the transmit coil. Multiple costs may be included in the cost entry.

The following table is an example of a configuration database 726.

| Transmit Coil Configuration | Switch Settings | Capacitances | Adjacent | Scan | Active | Cost |
|---|---|---|---|---|---|---|
| 1 | 10110 ... 00 | 1.314, ..., 0.000 | 2, 3, 5, 6, 7 | 1 | 0 | 5.6 |
| 2 | 11011 ... 00 | 0.000, ..., 0.000 | 1, 3, 4, 6, 7 | 0 | 1 | 4.5 |
| ... | ... | ... | ... | ... | ... | ... |
| N | 00000 ... 11 | 0.000, ..., 0.737 | N-2, N-1 | 1 | 1 | 9.1 |

This configuration database 726 may enumerate all possible transmit coil configurations from 1 to N. For each coil, the database 726 include information about topology, such as which switch settings are necessary to form the transmit coil and which transmit coils are directly adjacent. The capacitance settings can be set to achieve certain frequencies.

Entries in the configuration database 726 can be updated over time. For example, voltage values for the varactor in the capacitance value entry may be updated to account for drift over time. As the transmit coil is reconfigured, the associated active entries are updated. Other entries may be accessed and considered when optimizing a transmit coil.

The user database 728 may include a list of current devices (or users) that are registered with the power delivery system. Each device may be associated with a start time, type of device, payment information, or the like. The information associated with each device may be retained even when a device leaves the power delivery system. The information related to users and/or devices can be used to generate statistics over time.

The device database 730 may include information about different devices and their capabilities. The device database 730 may include information that describes the hardware of various devices (e.g., a description of the receive coil, resonant frequency, expected voltage/current in the receive coil to charge the device). The device database 730 enables the power delivery system to determine, by way of example, when power is being effectively transferred. For example, a voltage received from a device can be compared to values in the device database 730 to determine the efficiency of the power transfer.

Figure 8A:
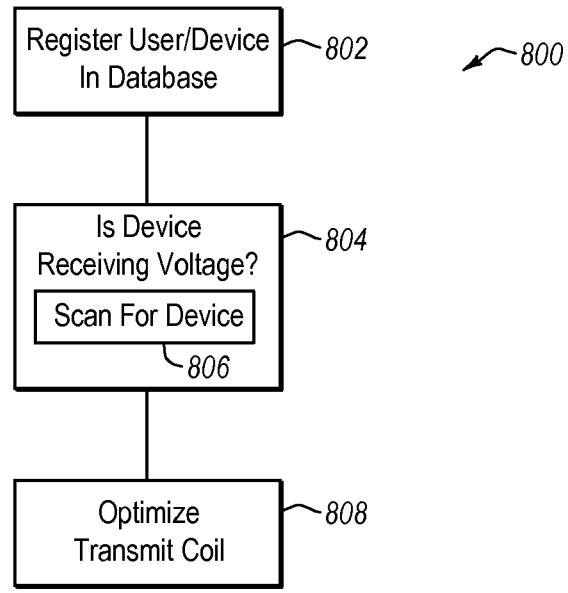
FIG. 8A illustrates an example of a method for adding a user or a device to a power delivery system.

FIG. 8A illustrates an example of a method for adding a user or a device to a power delivery system. FIG. 8A illustrates a method 800 for adding a user or device. In box 802 ("Register User/Device in Database"), a user registers with the power delivery system. In one example, a user's device may access the power delivery system over a network such as the Internet or over a wireless network. The user may provide information (or the device provides the information at the request of the user or automatically) to the power delivery system. In this context, the central controller assembly may act as a server that can communicate with a device. The user name, payment information, hardware data, device identifier, or the like may be provided to the central controller assembly. The registration of a user and/or of the user's device may be performed by the user module 734. The user or the device is registered and appropriate information is stored in the user database 728 and the device database 730 in box 802.

After the user/device is registered, the power delivery system determines whether the device is receiving voltage in box 804 ("Is Device Receiving Voltage?"). In one example, the device can report certain parameters to the central controller assembly. For example, the device may report a voltage and/or frequency associated with the receive coil of the device.

If no voltage is reported or if insufficient voltage is reported, then the system scans for the device in box 806 ("Scan for Device"). In one example, the power delivery system can scan for the device by activating selected transmit coils until a voltage is reported. Once a voltage is detected, the device is effectively located with respect to the transmit assembly or the grid of the infrastructure.

Once the device is detected and is receiving voltage from a transmit coil, the transmit coil is optimized in box 808 ("Optimize Transmit Coil").

FIG. 8A is an example that details how a user/device may be registered in the power delivery system. The power delivery system first stores the user information in the user database, and then retrieves parameters for the user's equipment from the device database. Power voltage measurements from the device are checked to see if the device is receiving enough power for optimization. The power delivery system may not be able optimize if there is not a strong enough signal. In the case of a weak signal or of no signal, the power delivery system scans through the transmit coil configurations with the scan bit in the configuration database enabled. The transmit coil configurations with the scan bit enabled corresponds, in one example, to a subset of transmit coil configurations that are sure to locate any device. For example, in a transmit assembly that includes a rectangular installation, the transmit coils associated with the four quadrants may have a scan bit enabled. The system can used these transmit coils to locate the user/device. Once the user's device receives enough power, the selected transmit coil can be optimized. The optimization of the transmit coil is described with respect to FIG. 9.

Figure 8B:
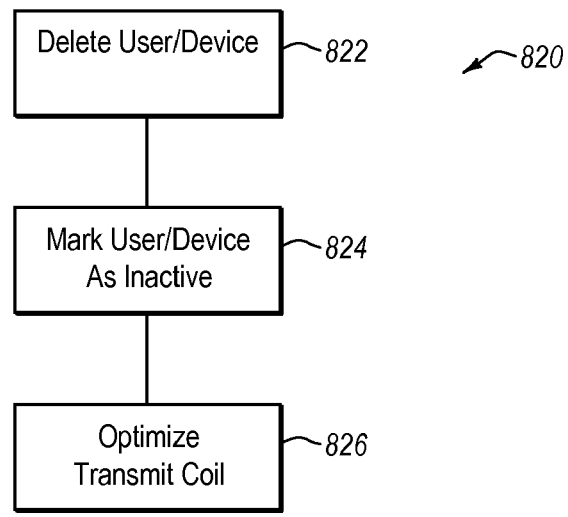
FIG. 8B illustrates an example of a method for removing a device or user from the power delivery system.

FIG. 8B illustrates an example of a method for removing a device or user from the power delivery system. In box 822 ("Delete User/Device"), a user or device is removed from the power delivery system. This may occur, for example, when a user terminates payment or when information is no longer received from the device. The frequency of the transmit coil may be changed, relocated, or deconstructed such that the device no longer receives power efficiently. This may occur when payment is required such that the device is not charged in the absence of payment. In box 824 ("Mark User as Inactive"), the device or user is marked as inactive in the user database.

In box 826 ("Optimize Transmit Coil"), the transmit coil is optimized. The optimization of a transmit coil is described with respect to FIG. 9.

Figure 9:
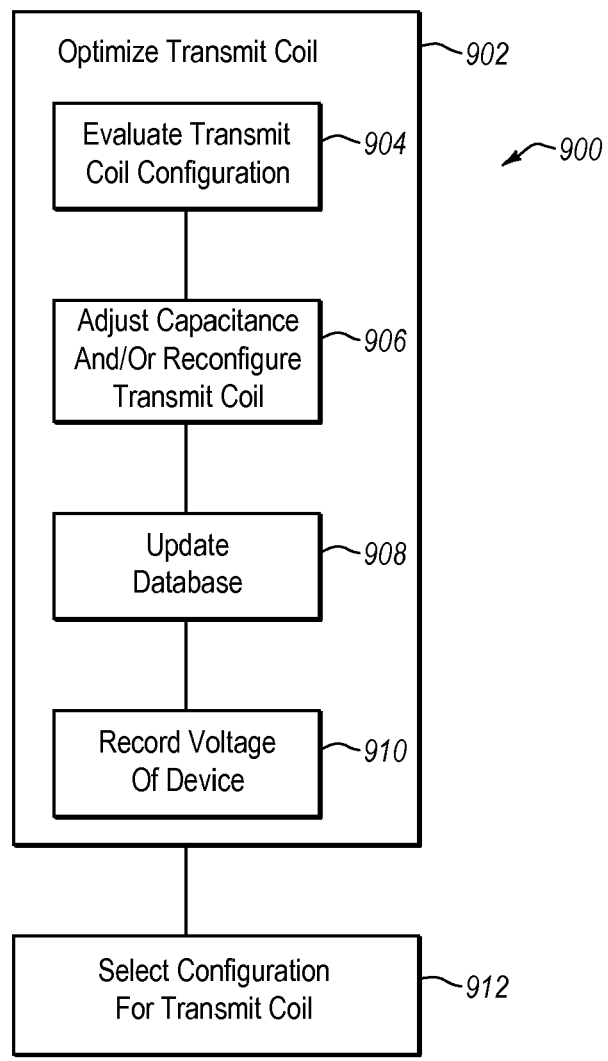
FIG. 9 illustrates an example of a method to optimize a transmit coil.

FIG. 9 illustrates an example of a method to optimize a transmit coil. FIG. 9 illustrates a method 900 to optimize a transmit coil that is formed in a transmit assembly. A similar method may be performed at the same time or at different times for other transmit coils that may be operational in the transmit assembly.

In box 902 ("Optimize Transmit Coil"), the transmit coil in a transmit assembly is optimized. For example, in box 904 ("Evaluate Transmit Coil Configuration"), the configuration of the transmit coil is evaluated. In one example, the transmit coil may be evaluated by comparing its frequency to a desired frequency such as the resonant frequency of a device in the appropriate database. If the frequency of the transmit coil does not match the desired frequency, then the transmit coil or characteristics of the transmit coil are adjusted in box 906 ("Adjust Capacitance and/or Reconfigure Transmit Coil").

The transmit coil can be reconfigured by evaluating adjacent transmit coils. Adjacent transmit coils are stored in the configuration database 724. If one of the adjacent transmit coil configurations, which are transmit coil configurations that can be formed with minimal adjustments, has the desired characteristics, then the transmit coil may be reconfigured by rearranging which conductive components are connected. This may include toggling switches in response to commands from the central controller assembly.

The transmit coil can also be adjusted when changes are made to the variable capacitances in one or more of the junction boxes associated with the transmit coil. The transmit coil can also be adjusted by changing the frequency and/or amplitude of the oscillator. The central controller assembly can instruct one or more of these options in box 906.

In box 908, the characteristics of the transmit coil that were changed are updated in the device database. This allows the power delivery system to know the current settings of that transmit coil.

In box 910 ("Record Voltage of Device"), the voltage of the device is recorded. The optimization of the transmit coil may a repetitive process where one or more elements are performed until the voltage reported by the device is maximized.

The optimization of the transmit coil in box 902 may consider more than one transmit coil configuration. The optimization of a transmit coil, which may include consideration of other transmit coil configurations, is quick process in part because much of the data for the transmit coil and for other transmit coil configurations is already stored and because the list of transmit coil configurations is finite.

In box 912 ("Select Configuration for Transmit Coil"), the configuration for the optimized transmit coil is selected and applied. The optimization may be based on one or more factors, such as power consumed, user voltage, or the like.

For this and other processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The method 900 can also be adapted for multiple devices. In one example, for one device or for multiple devices, all active transmit coils are taken and a list of adjacent transmit coils is created using the configuration database. The power delivery system then sets the transmit coil to each of these configurations in turn. For each, the system checks to see if the transmit coil has the desired frequency. If not, the power delivery system adjusts the capacitances and records the new value in the configuration database. The system then records the received voltages from all active devices.

Once the power delivery system has finished this scan it examines the recorded user voltages along with cost information stored in the configuration database to decide upon the best configuration.

Figure 10:
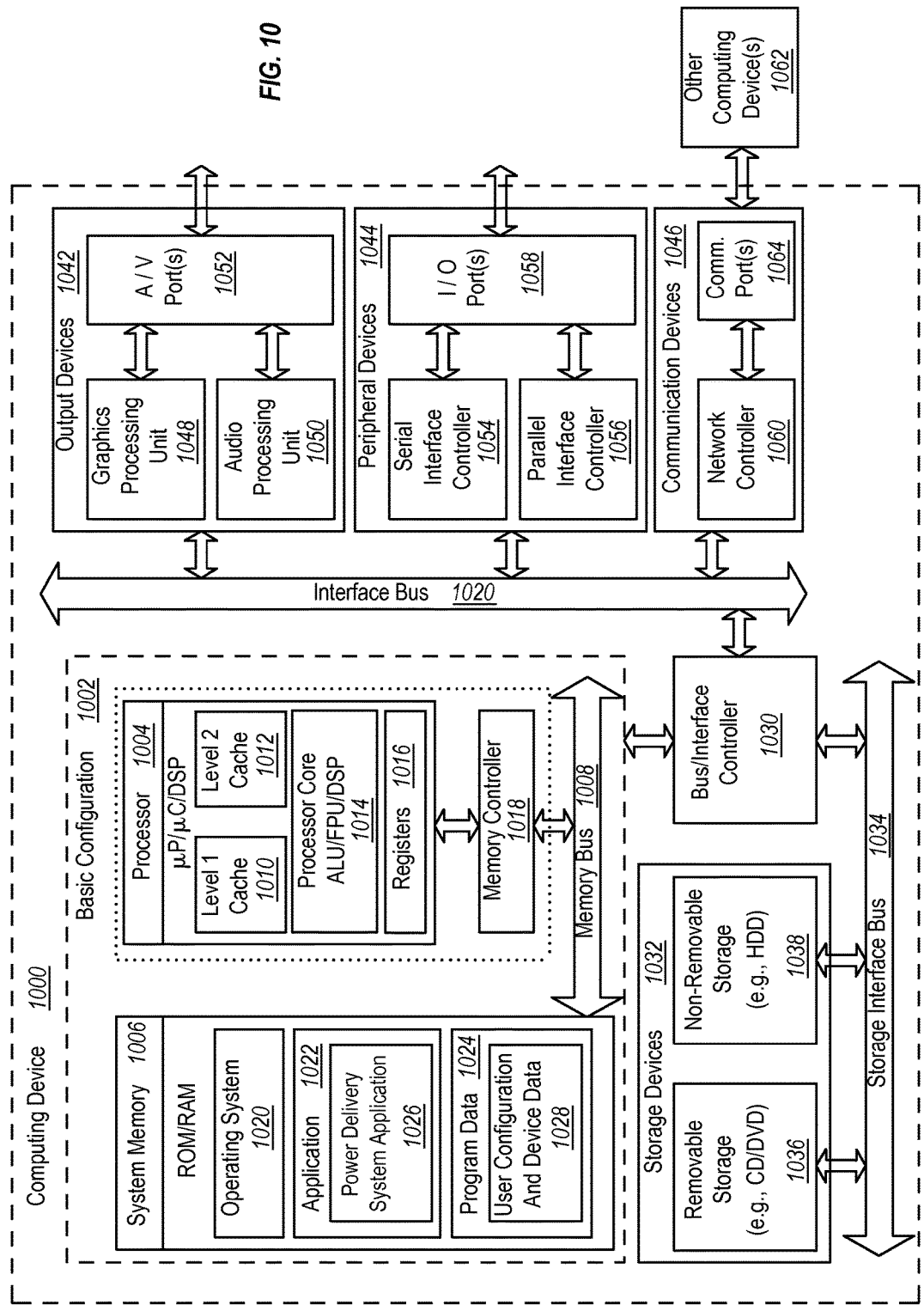
FIG. 10 shows an example computing device that is configured to manage or control a power delivery system.

FIG. 10 shows an example computing device that is configured to manage or control a power delivery system. The central controller system 720, as illustrated in FIG. 7, may include a computing device.

In a very basic configuration 1002, computing device 1000 generally includes one or more processors 1004 and a system memory 1006. A memory bus 1008 may be used for communicating between processor 1004 and system memory 1006.

Depending on the desired configuration, processor 1004 may be of any type including but not limited to a microprocessor ($\mu P$), a microcontroller ($\mu C$), a digital signal processor (DSP), or any combination thereof. Processor 1004 may include one more levels of caching, such as a level one cache 1010 and a level two cache 1012, at least one processor core 1014, and registers 1016. An example processor core 1014 may include an arithmetic logic unit (ALU), a floating point unit (FPU), a digital signal processing core (DSP Core), or any combination thereof. An example memory controller 1018 may also be used with processor 1004, or in some implementations memory controller 1018 may be an internal part of processor 1004. In one embodiment, the controller 508 of FIG. 5 may be embodied by the processor 1004 and/or other components of the computing device 1000.

Depending on the desired configuration, system memory 1006 may be of any type including but not limited to volatile memory (such as RAM), non-volatile memory (such as ROM, flash memory, etc.) or any combination thereof. System memory 1006 may include an operating system 1020, one or more applications 1022, and program data 1024. Application 1022 may include a power delivery system application 1026 that is arranged to perform at least some of the operations as described herein including at least some of those described with respect to method 800, 820, and 900. Program data 1024 may include user, configuration and/or device information or databases 1028 that may be useful to deliver power wirelessly, and/or may include other information usable and/or generated by the various other modules/components described herein. The configuration information 1028 may include device information, user information, transmit coil configurations, capacitances, resonant frequencies, or the like. In some embodiments, application 1022 may be arranged to operate with program data 1024 on operating system 1020 such that optical components are formed and reconfigured as described herein. This described basic configuration 1002 is illustrated in FIG. 10 by those components within the inner dashed line.

Computing device 1000 may have additional features or functionality, and additional interfaces to facilitate communications between basic configuration 1002 and any required devices and interfaces. For example, a bus/interface controller 1030 may be used to facilitate communications between basic configuration 1002 and one or more data storage devices 1032 via a storage interface bus 1034. Data storage devices 1032 may be removable storage devices 1036, non-removable storage devices 1038, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 1006, removable storage devices 1036 and non-removable storage devices 1038 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 1000. Any such computer storage media may be part of computing device 1000.

Computing device 1000 may also include an interface bus 1040 for facilitating communication from various interface devices (e.g., output devices 1042, peripheral interfaces 1044, and communication devices 1046) to basic configuration 1002 via bus/interface controller 1030. Example output devices 1042 include a graphics processing unit 1048 and an audio processing unit 1050, which may be configured to communicate to various external devices such as a display or speakers via one or more A/V ports 1052. Example peripheral interfaces 1044 include a serial interface controller 1054 or a parallel interface controller 1056, which may be configured to communicate with external devices such as input devices (e.g., keyboard, mouse, pen, voice input device, touch input device, etc.) or other peripheral devices (e.g., printer, scanner, etc.) via one or more I/O ports 1058. An example communication device 1046 includes a network controller 1060, which may be arranged to facilitate communications with one or more other computing devices 1062 over a network communication link via one or more communication ports 1064.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1000 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 may also be implemented as a personal computer including both laptop computer and non-laptop computer configurations.

The configuration of the transmit assembly may allow a transmit coil to be flexibly reconfigured in small increments, to automatically maintain efficiency. When incorporated into the electrical system of an infrastructure, the existing electrical system can carry both AC electrical power and high frequency current, with an overall current limit of the electrical system considered.

The central controller assembly may be configured to adapt transmission frequencies and other characteristics to account for the irregular coil shapes. Feedback from the devices that are coupled to the power delivery system can ensure that the system operates efficiently and optimally.

The conductive components that carry the high frequency current associated with the transmit coils can be carried by existing wiring that is capacitively coupled, new wires that are added, conducting metal conduits that exist or that are added.

Advantageously, high frequency current (e.g., 0.1-20 MHz in one example) typically flows only on a surface or on a "skin" of the conductor. Conductive components that have a larger radius (conduit is typically larger than electrical wires) results in a lower resistance. As a result, the Q or the ability to transmit power effectively can be achieved.

In situations where the conduit is electrically connected to ground for safety reasons, a capacitive ground connection can be implemented which is a short circuit for AC power (50/60 Hz) and that is an open circuit for high frequency current.

In some examples, the power delivery system could also be adapted to provide location and navigation services. This has the benefit of not draining power from the device. For example, the distance between the transmit coil and a user may be on the order of 2 meters and the transmit coils may have a radius on the order of 1 meter. This can provide accuracy of plus or minus 1 meter in terms of location. Movement of a user/device can be determined when the voltage reading because to change. The transmit coil associated with the device can then be reconfigured. Because the location of the transmit coil is known, the location and movement of the user can be determined and tracked. This could be used to provide location information for instance.

The transmit coils discussed herein may include one or more single turn coils and/or one or more multiple turn coils.

In some examples, a junction box may be adapted to establish a transmit coil in an environment that includes conductive components. An example junction box may comprise a housing or other mechanical support that includes one or more connections. Each connection may be configured to connect with one or more conductive components, such as a coil segment, wire, or other conducting element. A conducting component may include, in whole or in part, a conducting building component, such as a power cable, metal ductwork, dropped ceiling support, and the like. An example junction box may also include a controller, and at least one switch associated with each connection, wherein the at least one switch is controlled by the controller. In some examples, the at least one switch is controlled such that the conductive components associated with one of the one or more connections can be selectively and electrically connected and disconnected to each other. In some examples, the controller is responsive to control signals from a central controller assembly to operate the at least one switch. An example junction box may further comprise a variable capacitor, wherein the controller is responsive to control signals from a central controller assembly to change a capacitance of the variable capacitor in response to the control signals. For example, the variable capacitor may include an electrically adjustable dielectric material, such as a ferroelectric material, or a mechanically adjustable capacitor that may be controlled by an actuator. In some examples, a conductive component may include conduit that is electrically connected to the one or more connections. A conductive component may be electrically insulated from the housing. In some examples, one or more switches in the junction box include a semiconductor switch, such as a MOSFET switch, or other electrically controllable switch. A junction box may include one or more wires, where each wire connects one of the switches to a different conductive component. The controller and the at least one switch may receive power from electrical wires routed through the junction box. One or more conductive components may include a building component or portion thereof, such as wires, such as power carrying wires such as alternating current wires, e.g. mains electricity wires, conduits (such as heating/air conditioning conduits), metal structural building elements, low voltage electrical components (such as a low voltage lighting system) In some example, a low voltage lamp may be slid along parallel low voltage support wires to adjust a transmit coil configuration. In some examples, a junction box may derive power from such wires, e.g. by inductive coupling to an alternating current carrying wire. In some examples, a switch between conductive components may include a capacitive coupling between proximate conductive components. In some examples, a choke coil may be used to reduce or prevent high frequency transmit signals from propagating further along a wire while allowing direct current or low frequency (e.g. 50 Hz) current to pass with low loss.

In some examples, a central controller assembly, configured to coordinate with distributed controllers to manage transmit coils formed from conductive components to deliver power wirelessly to devices, comprises: a central controller operatively coupled with the plurality of distributed controllers; an interface component configured to receive information from the devices, wherein the central controller determines whether the devices are receiving power from at least one transmit coil; and wherein the central controller is configured to dynamically adjust a configuration of the at least one transmit coil based on the information received from the devices. In some examples, the information received from the devices includes at least one of a voltage and a frequency. In some examples, a central controller (or central controller assembly) may comprise a memory configured to store: a first database configured to store data related to multiple configurations of the transmit coil; a second database configured to store data related to devices that received power wirelessly from the transmit coil; and a third database configured to store information related to multiple receive coils. In some examples, a central controller (or central controller assembly) may comprise a user module configured to register users and enable the devices to receive power wirelessly. The central controller may be configured to form the transmit coil at a first location by electrically connecting multiple conductive components, for example through electrical communication with one or more junction boxes. A central controller may be configured to change at least one of: an operating frequency of the transmit coil, a resonant frequency of the transmit coil, an area of the transmit coil, the location of the transmit coil, or a capacitance associated with the transmit coil (for example, to adjust the resonant frequency). A central controller may be configured to form and/or manage characteristics of one or more transmit coils such that power is wirelessly delivered to one or more devices located at one or more locations. For example, a central controller may manage the transmission characteristics of a first transmit coil and a second transmit coil, such that the first transmit coil transmits wireless power to a first device and the second transmit coil delivers wireless power to a second device. One or more of a plurality of devices may be a mobile device. A central controller may be configured to change the frequency of a transmit coil by generating a control signal that causes a capacitance associated with the transmit coil to be changed. In some examples, the central controller may adjust the size (e.g. cross-sectional area in the plane of a planar closed loop) of the transmit coil by generating a control signal that rearranges how the conductive components are connected, for example through selective operation of one or more junction boxes. In some examples, a central controller assembly may further comprise a payment module configured to collect payment for usage of the transmit coil by the device. In some examples, central controller assembly may further comprise an interface component, and in some examples the interface component may receive information over a network connection, such as usage information. Usage information may include user identity, payment information (e.g. bank card details, electronic coupons, and the like), device information (such as frequency or other electrical information related to a coupling coil in the device), location, power received, signal strength (e.g. for fine tuning to maximize power transfer), and the like.

In some examples, a method for delivering power to a device comprises: scanning to detect the device; receiving information from the device, wherein the information includes a voltage a receive coil of the device to determine whether the device receives power wirelessly from a transmit coil; and adjusting a configuration of the transmit coil based on the information to improve the power delivered to the device wirelessly. An example method may include registering the device by storing information about a user of the device in a first database and storing parameters of the device in the first database. Scanning to detect the device may comprise forming one or more transmit coils and determining which of the one or more transmit coils the device receives power from. Adjusting a configuration of the transmit coil may include comparing a frequency of the transmit coil to the frequency received from the device and adjusting a variable capacitor to change a frequency of the transmit coil to match the frequency of the device. Adjusting a configuration of the transmit coil may include evaluating configurations for the transmit coil based on predetermined configurations stored in a first database. An example method may further comprise receiving information from multiple devices and determining whether each of the devices is receiving power wirelessly from the transmit coil. In some examples, a method may comprise recording voltages from each of the multiple devices. Adjusting a configuration of the transmit coil may include selecting a configuration of the transmit coil for the multiple devices to improve or optimize power delivery. A configuration may be updated dynamically over time. A configuration may be selected based on a device configuration, which may be determined by determining the device identity, or otherwise received. An example method may further comprise dynamically updating a configuration of the transmit coil in response to changes in a location of the device. Configurations of multiple transmit coils may be individually adjusted, based on information for one or more device with which each transmit coil is coupled. A transmit coil from conductive components present in an infrastructure, such as a building.

Forming the transmit coil may include: sending a control signal to each of one or more (e.g. a plurality) of controllers, such as distributed controllers, wherein the controllers are each associated with switches and a variable capacitor and wherein the controllers operate to selectively connect and disconnect the conductive components in response to the control signals; and/or (optionally) adjusting characteristics of each of one or more transmit coils. Adjusting a frequency of the transmit coil may comprise changing a capacitance of a variable capacitor associated with the transmit coil, for example using at least one of the controllers. In some examples, adapting a shape, size, and/or frequency of the transmit coil may be based on the information received from devices associated with the transmit coil.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure includes the terms of the appended claims, along with the full scope of equivalents to which such claims are entitled. This disclosure is not limited to particular methods, reagents, compounds compositions or biological systems, which can, of course, vary. The terminology used herein is for the purpose of describing particular embodiments only, and is not intended to be limiting.

In an illustrative embodiment, any of the operations, processes, etc. described herein can be implemented as computer-readable instructions stored on a non-transitory computer-readable medium. The computer-readable instructions can be executed by a processor of a mobile unit, a network element, and/or any other computing device.

The use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware are possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. Such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated by the following claims.

What is claimed is:

1. A method to deliver power wirelessly to a device, the method comprising:
   scanning, by a power delivery system, to detect the device by energizing one or more transmit coils of the power delivery system;
   receiving a voltage level of a receive coil of the device, wherein the voltage level is used to determine whether the device received power wirelessly from at least one of the one or more transmit coils;
   adjusting a configuration of the at least one transmit coil based on the voltage level; and
   storing one or more parameters associated with the device in a first database, wherein the one or more parameters associated with the device comprises a description of the receive coil, a resonant frequency, a specified voltage to charge the device, a specified current to charge the device, or combinations thereof.

2. The method of claim 1, wherein the scanning to detect the device comprises identifying the at least one of the one or more transmit coils that delivered power wirelessly to the device.

3. The method of claim 1, further comprising:
   receiving a second voltage level from a receive coil of a second device, different from the device, that received power from a second transmit coil, different from the at least one transmit coil, of the one or more transmit coils; and
   adjusting the configuration of the second transmit coil based on the second voltage level.

4. The method of claim 1, further comprising:
   receiving a second voltage level from a receive coil of a second device, different from the device, that received power from the at least one transmit coil of the one or more transmit coils.

5. The method of claim 1, further comprising:
   rescanning, by the power delivery system;
   receiving a rescanned voltage level of the receive coil of the device;
   comparing the rescanned voltage level to the voltage level; and determining a change in a location of the device based on a difference between the rescanned voltage level and the voltage level.

6. The method of claim 5, further comprising:
in response to the determining the change in the location of the device, deenergizing the at least one transmit coil and energizing a second transmit coil.

7. The method of claim 1, further comprising providing a central controller assembly, a plurality of conductive segments, and a plurality of junction boxes, wherein each junction box of the plurality of junction boxes is configured to selectively connect one of the plurality of conductive segments to at least one other conductive segment of the plurality of conductive segments, wherein the plurality of junction boxes are configured to selectively couple at least some of the plurality of conductive segments to form a third transmit coil in response to a control signal from the central controller assembly, wherein each junction box of the plurality of junction boxes includes a variable capacitor and is configured to be responsive to the control signal received from the central controller assembly to change a capacitance of the variable capacitor, and wherein the change in the capacitance of the variable capacitor changes a resonant frequency of the third transmit coil.

8. The method of claim 1, wherein adjusting the configuration of the at least one transmit coil comprises:
comparing a frequency of the at least one transmit coil to a frequency received from the device; and
adjusting a variable capacitor to change the frequency of the at least one transmit coil to match the frequency received from the device.

9. A method to deliver power wirelessly to a device, the method comprising:
scanning, by a power delivery system, to detect the device by energizing one or more transmit coils of the power delivery system;
receiving a voltage level of a receive coil of the device, wherein the voltage level is used to determine whether the device received power wirelessly from at least one of the one or more transmit coils; and
adjusting a configuration of the at least one transmit coil based on the voltage level, wherein adjusting the configuration of the at least one transmit coil comprises:
comparing a frequency of the at least one transmit coil to a frequency received from the device; and
adjusting a variable capacitor to change the frequency of the at least one transmit coil to match the frequency received from the device.

10. The method of claim 9, wherein adjusting the configuration of the at least one transmit coil further comprises evaluating configurations for the at least one transmit coil based on predetermined configurations.

11. The method of claim 10, wherein the evaluating comprises selecting a particular predetermined configuration that is associated with a frequency that substantially matches the frequency received from the device.

12. The method of claim 9, wherein the adjusting the variable capacitor to change the frequency of the at least one transmit coil to match the frequency of the device comprises adjusting a voltage supplied to the variable capacitor.

13. The method of claim 9, further comprising storing one or more parameters associated with the device in a first database, wherein the one or more parameters associated with the device comprises a description of the receive coil, a resonant frequency, a specified voltage to charge the device, a specified current to charge the device, or combinations thereof.

14. A method to provide power wirelessly to a device, the method comprising:
providing power from a transmit coil to a receive coil, wherein the receive coil is associated with the device;
determining whether a frequency of the transmit coil matches a predetermined frequency, wherein the predetermined frequency is a resonant frequency of the device; and
adjusting one or more parameters associated with the transmit coil based on determining that the frequency of the transmit coil does not match the predetermined frequency, wherein the adjusting one or more parameters associated with the transmit coil comprises adjusting a capacitance of the transmit coil.

15. The method of claim 14, wherein the adjusting one or more parameters associated with the transmit coil comprises adjusting a voltage associated with a varactor, wherein the varactor is coupled to the transmit coil.

16. The method of claim 14, wherein the adjusting one or more parameters associated with the transmit coil comprises adjusting one or more parameters associated with the transmit coil based on an adjacent configuration entry in a database.

17. The method of claim 14, further comprising providing an oscillator coupled to the transmit coil, and wherein the adjusting one or more parameters associated with the transmit coil comprises adjusting one or more parameters of the oscillator coupled to the transmit coil.

18. A system to deliver power wirelessly, the system comprising:
a device comprising one or more receive coils configured to receive power; and
a transmit assembly comprising one or more transmit coils, wherein the transmit assembly is configured to perform operations comprising:
providing power from at least one of the one or more transmit coils to the one or more receive coils;
determining whether a frequency of the at least one of the one or more transmit coils matches a predetermined frequency, wherein the predetermined frequency is a resonant frequency of the device;
adjusting one or more parameters associated with the at least one of the one or more transmit coils based on determining that the frequency of the at least one of the one or more transmit coils does not match the predetermined frequency;
receiving a measured voltage associated with each of the one or more receive coils;
comparing the measured voltage associated with each of the one or more receive coils to a predetermined voltage; and
determining an efficiency of power transfer between the at least one of the one or more transmit coils and each of the one or more receive coils based at least on the comparison of the measured voltage with the predetermined voltage.

19. The system of claim 18, wherein the operations further comprise adjusting one or more parameters associated with the one or more transmit coils based on the efficiency of power transfer between the one or more transmit coils and the one or more receive coils.

* * * * *